US012277584B2

(12) United States Patent
Reda et al.

(10) Patent No.: US 12,277,584 B2
(45) Date of Patent: Apr. 15, 2025

(54) TRAINING A MACHINE LEARNING MODEL TO ESTIMATE A TIME FOR A SHOPPER TO SELECT AN ORDER FOR FULFILLMENT AND ACCOUNTING FOR THE ESTIMATED TIME TO SELECT WHEN GROUPING ORDERS

(71) Applicant: Maplebear Inc., San Francisco, CA (US)

(72) Inventors: Greg Reda, San Francisco, CA (US); Jagannath Putrevu, Daly City, CA (US); Kevin Charles Ryan, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 70 days.

(21) Appl. No.: 17/493,780

(22) Filed: Oct. 4, 2021

(65) Prior Publication Data
US 2023/0105829 A1  Apr. 6, 2023

(51) Int. Cl.
*G06Q 30/0601* (2023.01)
*G06F 18/214* (2023.01)
*G06N 3/04* (2023.01)

(52) U.S. Cl.
CPC ....... *G06Q 30/0605* (2013.01); *G06F 18/214* (2023.01); *G06N 3/04* (2013.01)

(58) Field of Classification Search
CPC ................... G06F 18/214; G06N 3/04; G06Q 30/06–0645; G06Q 30/08; G06Q 50/01; G16Y 10/00–90
See application file for complete search history.

(56) References Cited

U.S. PATENT DOCUMENTS 11,574,325 B1 * 2/2023 Yuan ................... G06Q 30/0633
11,830,018 B2 * 11/2023 Deng ................... G06Q 30/0635
(Continued)

FOREIGN PATENT DOCUMENTS

WO   WO-2016065347 A1 *  4/2016  ............. G06Q 10/02

OTHER PUBLICATIONS

Anonymous, "Method and System for Scheduling In-Store Pickers based on Delivery Needs," IP.com Technical Disclosure, IPCOM000253710D, Apr. 25, 2018. (Year: 2018).*

(Continued)

*Primary Examiner* — Adam L Levine
(74) *Attorney, Agent, or Firm* — Fenwick & West LLP

(57) ABSTRACT

An online concierge system receives orders from users identifying items and a warehouses from which the items are obtained. The online concierge system displays groups of one or more orders to shoppers, allowing a shopper to select a group of orders for fulfillment. When selecting groups of orders to display to shoppers, the online concierge system accounts for costs for fulfilling different groups and displays groups having costs satisfying one or more criteria, while maintaining one or more restrictions on times to fulfill orders. The online concierge system trains a selection prediction model to predict an amount of time for a shopper to select a group of orders and determines an estimated fulfillment time for the group from the predicted amount of time. Accounting for the predicted selection time allows the online concierge system to identify a larger number of groups for which costs of fulfillment are determined.

20 Claims, 5 Drawing Sheets

(56) References Cited

U.S. PATENT DOCUMENTS

2022/0292580 A1\* 9/2022 Putrevu ............ G06Q 10/06315
2022/0414592 A1\* 12/2022 Wang ................ G06Q 10/0833

OTHER PUBLICATIONS

Ye et al., "Drivers and barriers of omnichannel retailing in China: A case study of the fashion and apparel industry," International Journal of Retail & Distribution Management, Jun. 2018, 33pp. (Year: 2018).\*

\* cited by examiner

TRAINING A MACHINE LEARNING MODEL TO ESTIMATE A TIME FOR A SHOPPER TO SELECT AN ORDER FOR FULFILLMENT AND ACCOUNTING FOR THE ESTIMATED TIME TO SELECT WHEN GROUPING ORDERS

BACKGROUND

This disclosure relates generally to ordering items through an online concierge system, and more specifically to determining an estimated time for a shopper to select an order for fulfillment.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Conventional online concierge systems maintain discrete time windows during which orders are fulfilled, and a user selects a specific time window for an order to be fulfilled and delivered to the user. For example, a user selects a time window corresponding to a specific range of times to schedule an order for fulfillment in the future or selects a time window that is an amount of time from a time when the order is placed for the order to be fulfilled as soon as possible. This allows users of an online concierge system to select a specific window for receiving items from an order or to obtain the items in an order within a specified time interval from a time when the order is placed.

Additionally, to efficiently fulfill orders and provide items to users, an online concierge system allows shoppers to select groups, or batches, of multiple orders to fulfill. As a group includes multiple orders, selecting a group of orders allows a shopper to fulfill orders from multiple users to decrease amounts of time between the online concierge system receiving an order and users receiving items from corresponding orders. However, to account for a discrete time interval or other delivery time specified in an order, conventional online concierge systems prevent a shopper from selecting a group of orders if the conventional online concierge system includes at least one order that would have an estimated delivery time later than the specified discrete time interval or later than the specified delivery time of the order. Many conventional online concierge systems further prevent an order having an estimated delivery time later than the specified discrete time interval or later than the specified delivery time of the order from being included in a group with other orders. While this configuration seeks to fulfill potentially late orders to the user as soon as possible, limiting fulfillment of orders estimated to be fulfilled later than a specified time does not account for potential delays by shoppers in selecting a single order for fulfillment, as fulfilling a group of multiple orders is a more efficient use of a shopper's time and resources. Similarly, if a limited number of shoppers are available for fulfilling orders, an increased number of orders may have estimated delivery times later than corresponding specified delivery times, increasing a number of orders that are limited to being selected and fulfilled individually, which decreases order fulfillment efficiency and further lengthens amounts of time for the limited number of shoppers to fulfill orders.

SUMMARY

An online concierge system maintains a plurality of time intervals, such as discrete time intervals, during which orders received by the online concierge system are fulfilled. For example, the online concierge system maintains multiple two hour intervals during for fulfilling orders. This allows a user of the online concierge system to select a discrete time interval for an order provided by the user, so items included in the order are delivered to the user at a time within the selected discrete time interval. By selecting a discrete time interval, a user of the online concierge system is able to schedule delivery of items in the order at a future time within the selected discrete time interval, allowing the user to tailor when the order is fulfilled.

Additionally, the online concierge system allows a user to specify a short-term order for fulfillment when there is shopper availability after the online concierge system receives the order. The online concierge system displays an interface to a user allowing the user to identify an order for short-term fulfillment or to select a discrete time interval during which the order is fulfilled. The interface includes an estimated time of arrival for the order in conjunction with an option for short-term fulfillment of the order to provide the user with an estimate of a time by which the user will receive the order to allow the user to more accurately determine whether to identify the order for short-term fulfillment.

To determine the estimated time of arrival for the order, the online concierge system retrieves historical data describing fulfilled orders previously received by the online concierge system. For a previously fulfilled order, the historical data includes information identifying a location to which the previously fulfilled order was delivered, items included in the previously fulfilled order, a number of items included in the previously fulfilled order, a value of the previously fulfilled order, a warehouse from which the items of the previously fulfilled order were obtained, a distance traveled by a shopper to deliver items from the warehouse to the location identified by the previously fulfilled order, a time when the online concierge system received the previously fulfilled order, and a time when the previously fulfilled order was fulfilled. From the historical data describing previously fulfilled orders, the online concierge system trains a selection prediction model to determine a predicted amount of time between the online concierge system creating a group including one or more received orders from one or more users and a shopper selecting the group for fulfillment. Hence, the selection prediction model receives a group of orders as input and outputs a predicted amount of time for a shopper to select the group of orders for fulfillment. The selection prediction model may determine the amount of time for the shopper to select a group of orders from characteristics of each order in the group.

In various embodiments, the online concierge system generates and trains a selection prediction model for different geographic regions, with a geographic region including one or more locations identified by orders. Maintaining selection models for different geographic regions allows the online concierge system to account for differences in numbers of orders received in different geographic locations and numbers of shoppers available to fulfil orders in different geographic locations. In various embodiments, the online concierge system trains each selection prediction model at a periodic interval. For example, the online concierge system trains selection prediction models daily, or at any other suitable interval.

To train a selection prediction model, the online concierge system extracts a set of characteristics of previously received orders that have been fulfilled. In various embodiments, the online concierge system identifies a geographic region and identifies a selection prediction model for the identified geographic region. To train the identified selection prediction model, the online concierge system identifies groups of one or more orders including locations within the identified geographic region and extracts characteristics of the identified groups. Each group includes one or more orders, with each order in a group identifying a location within the geographic region. Example characteristics of a group include: one or more warehouses identified by orders included in the group, times when orders included in the group were received by the online concierge system, a day of the week when orders included in the group were received by the online concierge system, a number of discrete items included in the group, a total quantity of items included in the group, a distance for a shopper to travel to fulfill the orders included in the group, a number of orders in the group, an amount of compensation the shopper receives for fulfilling orders included in the group, and any other suitable information. When determining characteristics of a group including multiple orders, the online concierge system combines characteristics of the orders included in the group to determine the characteristics of the group in various embodiments; for example, the online concierge system sums quantities of items included in each order of a group or sums numbers of discrete items included in each order of a group. Additionally, a characteristic of a group including one or more orders is a value determined from a number of shoppers available in the geographic region at a time when the group was selected by a shopper and a number of groups including orders identifying a location within the geographic region available for selection at the time when the group was selected. For example, the value is a ratio of the number of shoppers available in the geographic region at a time when the group was selected by a shopper and the number of orders identifying a location within the geographic region available for selection. Determining the value from the number of shoppers available in the geographic region and a number of orders identifying a location within the geographic region available for selection allows the online concierge system to account for a relative supply and demand in the geographic region when shoppers selected groups for fulfillment. The online concierge system may extract any suitable characteristics from groups of orders including locations within the identified geographic region in various embodiments.

The online concierge system generates training data for the selection prediction model comprising a plurality of examples that each identify a set of characteristics corresponding to a group of previously received orders. For example, each example includes one or more warehouses identified by orders included in the group, times when orders included in the group were received by the online concierge system, a day of the week when orders included in the group were received by the online concierge system, a number of discrete items included in the group, a total quantity of items included in the group, a distance for a shopper to travel to fulfill the orders included in the group, a number of orders in the group, an amount of compensation the shopper receives for fulfilling orders included in the group, and the value determined from a number of shoppers available in the geographic region at a time when the group was selected by a shopper and a number of groups including orders identifying a location within the geographic region available for selection at the time when the group was selected. However, in other embodiments, an example of the training data includes a subset of the previously-identified characteristics or includes different or additional characteristics than those previously-identified. Each example of the training data is labeled with a length of time between a time when the group was created and a time when the shopper selected the example for fulfillment. Hence, the online concierge system uses the length of time between creation of previously fulfilled groups of orders and selection of the groups for fulfillment to shoppers for training the selection prediction model, allowing the online concierge system to leverage historical fulfillment of orders by shoppers to determine a length of time between creation of a group of orders by the online concierge system and selection of the group of orders for fulfillment by a shopper.

The online concierge system applies the selection prediction model to each of a plurality of examples of the training data. For an example of the training data (which includes a set of characteristics of a group of orders), application of the selection prediction model to the user generates a predicted amount of time for a shopper to select the group of orders for fulfillment. The online concierge system determines an error term from a difference between the label applied to the example of the training data and the predicted amount of time for a shopper to select the group of orders for fulfillment. The error term may be generated through any suitable loss function, or combination of loss functions, in various embodiments. For example, the loss function is a mean squared error between a predicted amount of time for a shopper to select the group of orders for fulfillment from an example of the training data and a label applied to the corresponding example user of the training data. However, in other embodiments, any loss function or combination of loss functions, may be applied to the predicted amount of time for a shopper to select the group of orders for fulfillment and the label applied to the corresponding example of the training data to generate the error term.

The online concierge system backpropagates the one or more error terms from the label applied to an example of the training data and the predicted amount of time for a shopper to select the group of orders for fulfillment through layers of a network comprising the selection prediction mode after initializing the layers. One or more parameters of the network are modified through any suitable technique from the backpropagation of the one or more error terms through the layers of the network. For example, weights between nodes of the network, such as nodes in different layers of the network, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the network is stopped. In some embodiments, the online concierge system uses gradient descent or any other suitable process to minimize the one or more error terms in various embodiments.

In response to the one or more loss functions satisfying the one or more criteria and the online concierge system stopping the backpropagation of the one or more error terms, the online concierge system stores the set of parameters for the layers of the selection prediction network. For example, the online concierge system stores the weights of connections between nodes in the network as the set of parameters of the network in a non-transitory computer readable storage medium. Hence, training of the selection prediction model allows the online concierge system to generate and to store a neural network, or other machine learning model, that generates a predicted amount of time for a shopper to select the group of orders for fulfillment. The selection prediction model may be any machine learning model, such as a neural network, boosted tree, gradient boosted tree, or random forest model in various embodiments. In some examples, the selection prediction model is trained via a XGBoost process when the selection prediction model is applied to examples of the training data. The online concierge system retrains the selection prediction model at various intervals, such as at a periodic interval, in various embodiments, allowing the selection prediction model to account for changes in available shoppers within the geographic region or changes in numbers of orders including locations within the geographic region at different times.

Alternatively, the online concierge system generates the trained selection prediction model as a tree based ensemble model combining multiple decision trees. In various embodiments, the online concierge system selects at least a set of examples of the training data (which each include a set of characteristics of a group of orders) and trains a decision tree on each example of the set by applying a decision tree to each example and comparing a predicted amount of time for a shopper to select the group of orders for fulfillment from application of the decision tree to an example to a label applied to the example. For example, the decision tree iteratively selects features of an example of the training data and selects a feature causing a loss function to satisfy one or more criteria, for example a feature minimizing a squared error between a predicted distance from the decision tree and a label applied to the example of the training data. The online concierge system sums the loss function over each example of the set to determine a total loss function and selects a feature having a minimum total loss function across the examples of the training data. Subsequently, the online concierge system splits the examples of the training data into subsets having different values for the selected feature and recursively generates new nodes of the decision tree using the subsets of examples until one or more halting criteria are satisfied (e.g., each leaf node of a decision tree includes a minimum number of examples of the training data).

In some embodiments, the online concierge system trains multiple decision trees in series, training an initial decision tree as described above and determining a loss function for the initial decision tree based on differences between a predicted amount of time for a shopper to select the group of orders for fulfillment from the decision tree and a label applied to the example of the training data. For example, the loss function is a squared error function between the predicted amount of time for a shopper to select the group of orders for fulfillment and the label applied to the example of the training data. The online concierge system trains another decision tree based on the results of the loss function for each example of the training data and iteratively trains decision tress, with results of the loss function from a decision tree used to train an immediately subsequent decision tree. For example, a gradient of the loss function from a decision tree is used to train an immediately subsequent decision tree. The online concierge system iteratively trains decision trees from the results of the loss function from another decision tree until a specific number of decision trees are trained or until one or more other halting criteria are satisfied. By iteratively propagating a result of a loss function for a decision tree to a subsequent decision tree, an output of a decision tree compensates for errors from an earlier another tree from which the decision tree receives results of the loss function. The output of the selection prediction model is a combination (e.g., a sum) of the predicted amount of time for a shopper to select the group of orders for fulfillment output by each of the trained decision trees.

After training and storing the trained selection prediction model, when the online concierge system generates a group from one or more received orders and determines a predicted amount of time for a shopper to select the group of orders for fulfillment by applying the selection prediction model to a set of characteristics extracted from the group of orders. In various embodiments, the online concierge system determines a geographic region including locations included in each order of the group, retrieves a selection prediction model corresponding to the determined geographic region, and applies the selection prediction model corresponding to the determined geographic region to the group of orders, allowing the online concierge system to account for conditions particular to the geographic region including locations of the orders in the group when determining a predicted amount of time for a shopper to select the group of orders for fulfillment.

As the online concierge system receives orders including locations identifying the geographic region, the online concierge system generates groups including individual orders and combinations of orders. For each group of orders, the online concierge system determines a predicted amount of time for a shopper to select a group for fulfillment. The online concierge system generates an estimated fulfillment time for each group of orders, with the estimated fulfillment time for a group of orders based on the predicted amount of time for a shopper to select the group for fulfillment. In various embodiments, the estimated fulfillment time for a group combines the predicted amount of time for the shopper to select the group for fulfillment with an estimated travel time for the shopper to obtain the items included in the group from one or more warehouses identified by orders in the group and to deliver the items of the orders of the group to locations specified by orders in the group. For example, the estimated fulfillment time for a group is a sum of the predicted amount of time for a shopper to select the group for fulfillment and the estimated travel time for the shopper to obtain the items included in the group and to deliver the items included in the group to one or more locations identified by orders of the group. In various embodiments, the online concierge system determines the estimated travel time for a group from characteristics of the orders included in the group as well as historical information about traffic or road conditions the online concierge system obtains from a third party system or from previously fulfilled orders by shoppers. Example characteristics of a group used to determine estimated travel time include a number of items in the group (groups with greater number of items may increase a length of time in a warehouse to obtain the items), one or more warehouses from which the items are obtained, distances between warehouses identified by orders of the group, and a distance between the locations of the one or more warehouses from which the items are obtained and locations identified by the one or more orders of the group. The online concierge system may generate and train a travel time prediction model, as further described above in conjunction with the selection prediction model, from characteristics of previously fulfilled groups of orders and travel times for shoppers to fulfill the previously fulfilled groups of orders. The travel time estimation model may be any machine learning model, such as a neural network, boosted tree, gradient boosted tree, random forest model, or combination of machine learning models.

To determine groups of orders displayed to shoppers for selection, the online concierge system determines a cost for fulfilling each group of orders. The cost for fulfilling a group of orders is based on characteristics of orders in a group (e.g., a number of items in then group, a weight of items in the group), the estimated travel time to fulfill the orders of the group, and the predicted amount of time for a shopper to select the group of orders for fulfillment and accounts for costs by the online concierge system for order fulfillment. In various embodiments, the online concierge system applies a cost function to different groups and selects groups for display to the user based on the costs so each order is displayed for individual fulfillment and is displayed in a specific number of groups including multiple orders.

The online concierge system determines candidate groups to which the cost function is applied by accounting for one or more constraints on estimated fulfillment times for groups of orders. The online concierge system identifies a group including a plurality of orders and determines an estimated fulfillment time for individually fulfilling each order of the group. The online concierge system similarly determines an estimated fulfillment time for fulfilling the group including multiple orders and selects the group including multiple orders for application of the cost function in response to the estimated fulfillment time for fulfilling the group being within a threshold amount of time of an estimated fulfillment time for individually fulfilling at least one individual order of the group. If the estimated fulfillment time for fulfilling the group is not within a threshold amount of time of an estimated fulfillment time for individually fulfilling at least one individual order of the group. the online concierge system does not select the group of multiple orders for application of the cost function. The online concierge system selects the group including multiple orders in response to the estimated fulfillment time of the group being within the threshold amount of time of a time specified by at least one order included in the group and does not select the group including multiple orders in response to the estimated fulfillment time of the group not being within the threshold amount of time of a time specified by at least one order included in the group.

Accounting for the predicted amount of time for a shopper to select the group of orders for fulfillment when determining the estimated fulfillment times allows the online concierge system to more accurately estimate an amount of time from creation of a group of orders to fulfillment of the group of orders. As groups including larger numbers of orders may have shorter times between creation and selection by a shopper, such a reduction in time to selection by a shopper for fulfillment may offset increased travel time for the shopper. Similarly, a group including a single order may have a shorter estimated travel time for fulfillment but a longer time from creation to selection for fulfillment, with the increased time from creation to selection resulting in a longer total time for fulfillment for the group including the single order. Further, accounting for a threshold amount of time from a fulfillment time for fulfillment of a single order or from a time specified by an order in a group allows the online concierge system to apply the cost function to a larger number of groups, allowing the online concierge system to evaluate an increased number of groups, allowing the online concierge system to determine more optimal groups of orders to display to shoppers for selection that minimize costs to the concierge system of fulfillment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
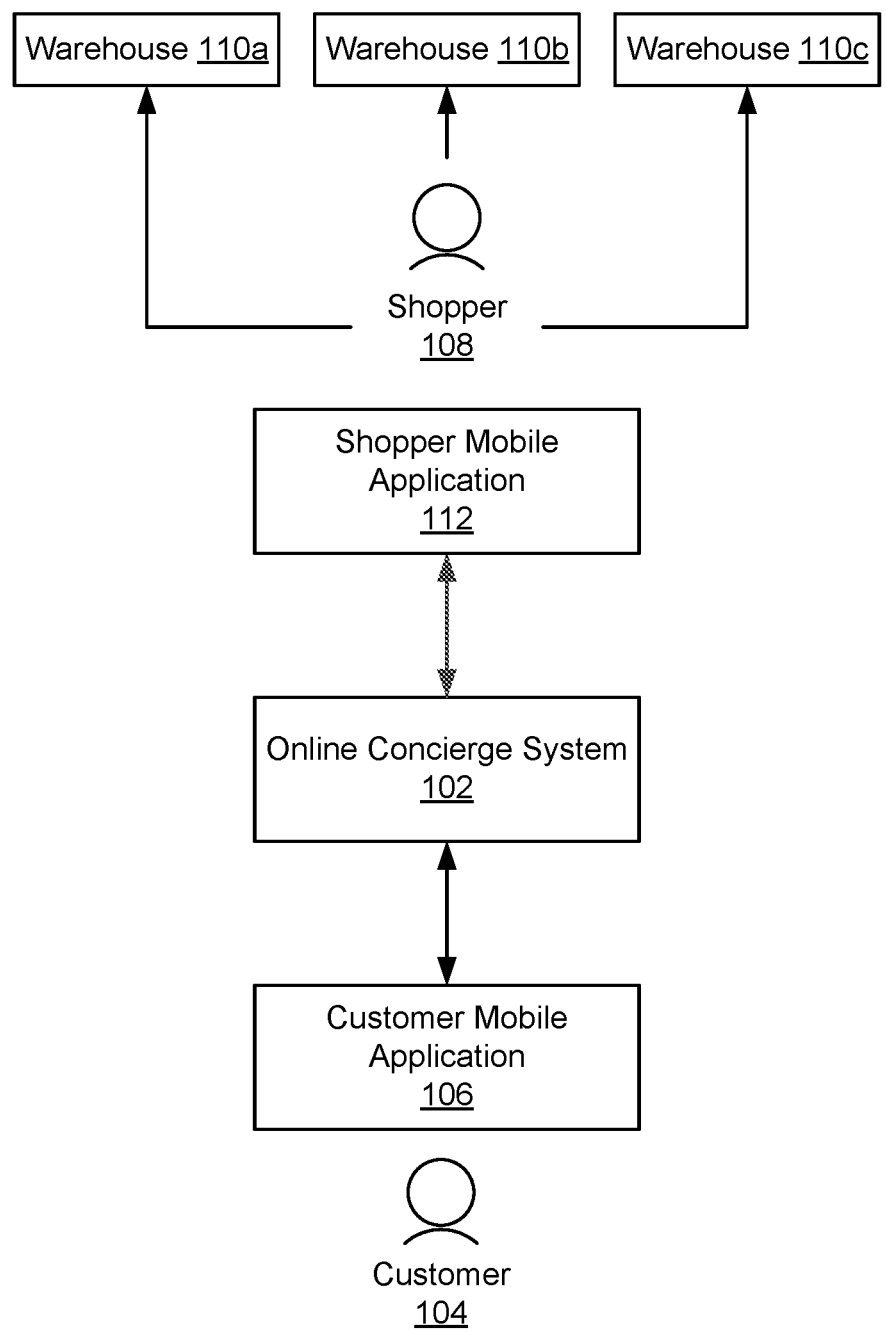
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
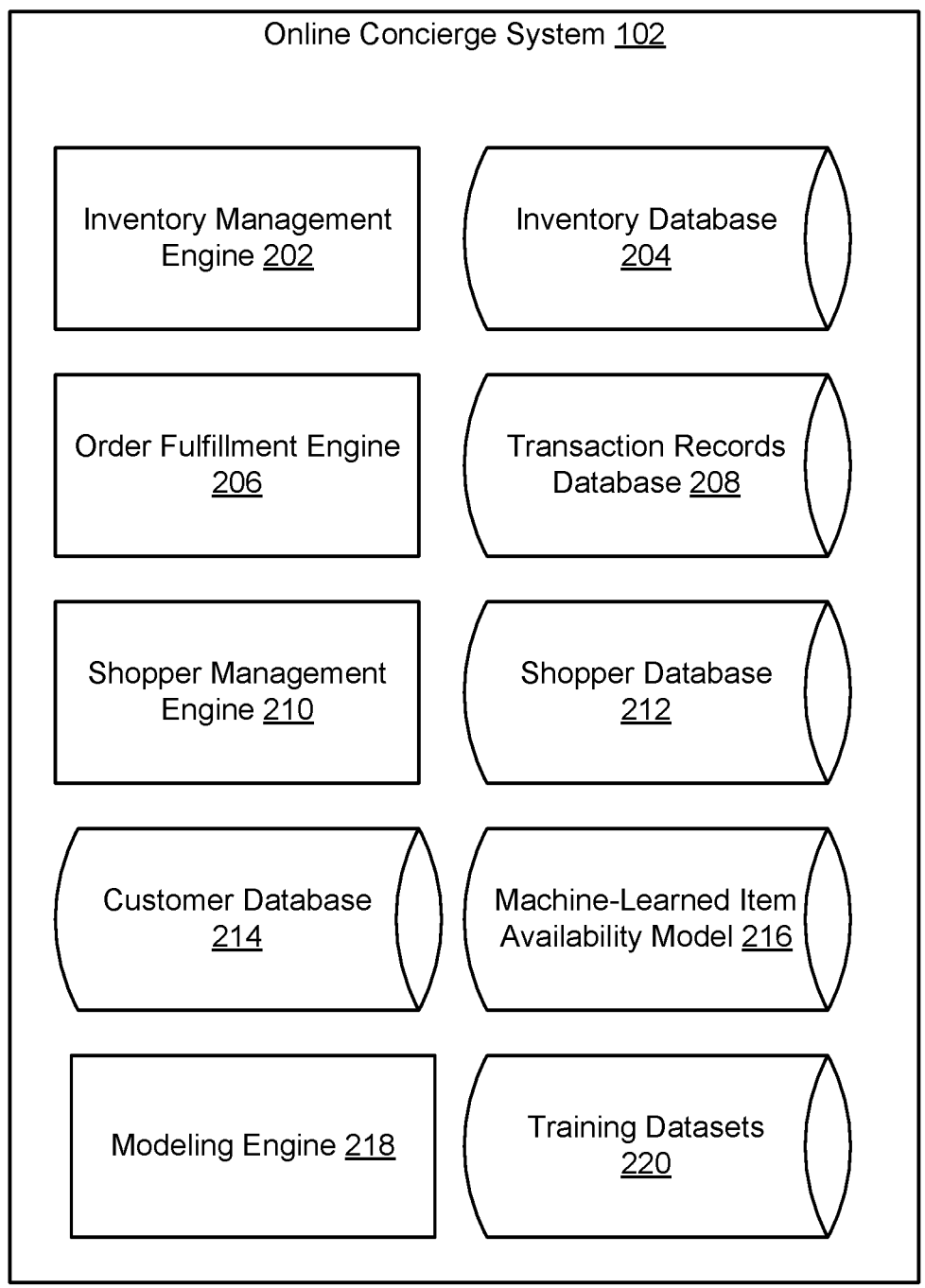
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIG. 4.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 generates groups of one or more orders, allowing a shopper to select a group to fulfill orders included in the group. The order fulfillment engine 206 selects a set of groups of orders to display to shoppers for selection. When selecting groups, the order fulfillment engine 206 accounts for a cost to the online concierge system 102 to fulfill different groups of orders and selects groups with costs satisfying one or more criteria for selection by shoppers, allowing the order fulfillment engine 206 to display groups of orders for selection by shoppers that optimize costs to the online concierge system 102 for fulfilling the groups of orders. When determining groups of orders for which costs of fulfillment are determined, the order fulfillment engine 206 identifies a group of orders to the modeling engine 218, which applies a trained selection prediction model, further described below in conjunction with FIG. 5, to determine a predicted time for shoppers to select the group of orders for fulfillment. From the predicted time for a shopper to select a group of orders, the order fulfillment engine 206 determines an estimated fulfillment time for the group that also accounts for an estimated travel time for a shopper to retrieve and deliver items to locations identified by orders included in the group.

While the order fulfillment engine 206 displays groups including a single order to shoppers for fulfillment, allowing shoppers to select individual orders for fulfillment, for a group including multiple orders, the order fulfillment engine 206 determines estimated fulfillment times for individual orders included in the group and an estimated fulfillment time for the group as a whole. The order fulfillment engine 206 compares the estimated fulfillment time for the group to the estimated fulfillment times for individual orders included in the group. In response to the estimated fulfillment time for the group being within a threshold amount of time from an estimated fulfillment time for at least one individual order included in the group, the order fulfillment engine 206 determines a cost to the online concierge system 102 for fulfilling the group including multiple orders, as further described below in conjunction with FIGS. 4 and 5. However, if the estimated fulfillment time for the group is not within a threshold amount of time from an estimated fulfillment time for at least one individual order included in the group, the order fulfillment engine 206 does not determine a cost to the online concierge system 102 for fulfilling the group including multiple orders. This allows the order fulfillment engine 206 to evaluate a larger number of groups of orders to better identify groups that optimize cost to the online concierge system 102 for fulfillment, while enforcing constraints on potential lateness in order fulfillment to improve user interaction with the online concierge system 102.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained selection prediction model, further described below in conjunction with FIG. 4 that determines a predicted amount of time for a shopper to select a group including one or more orders from generation of the group based on characteristics of the group. In various embodiments, the characteristics of the group are determined from characteristics of orders included in the group. Hence, the selection prediction model predicts an amount of time for a shopper to select a group from a time when the group is created from characteristics of orders included in a group. The trained selection prediction model may be trained using any suitable method or combination of methods (e.g., supervised learning, unsupervised learning, semi-supervised learning, etc.) and may be any machine learning model, such as a neural network, boosted tree, gradient boosted tree, random forest model, or combination of machine learning models, as further described below in conjunction with FIG. 4.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
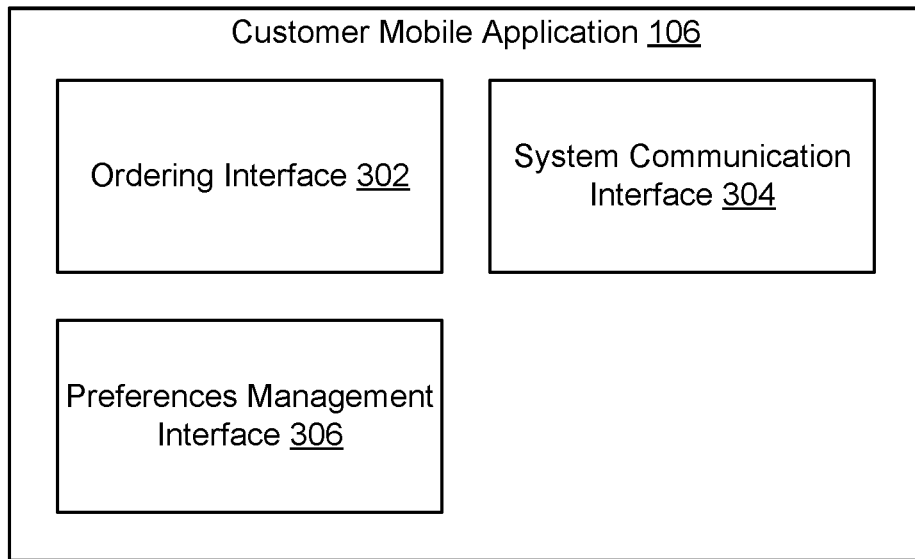
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
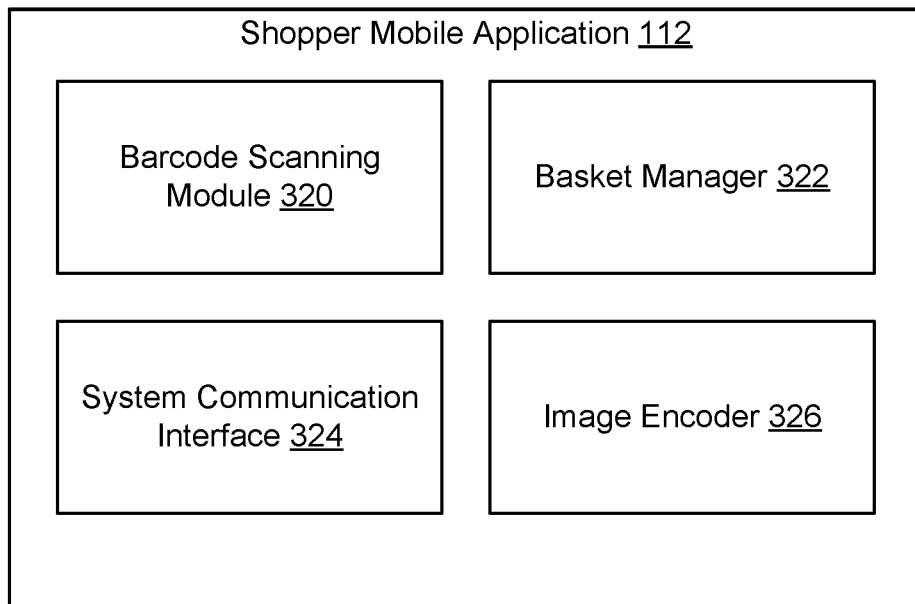
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket." In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 4:
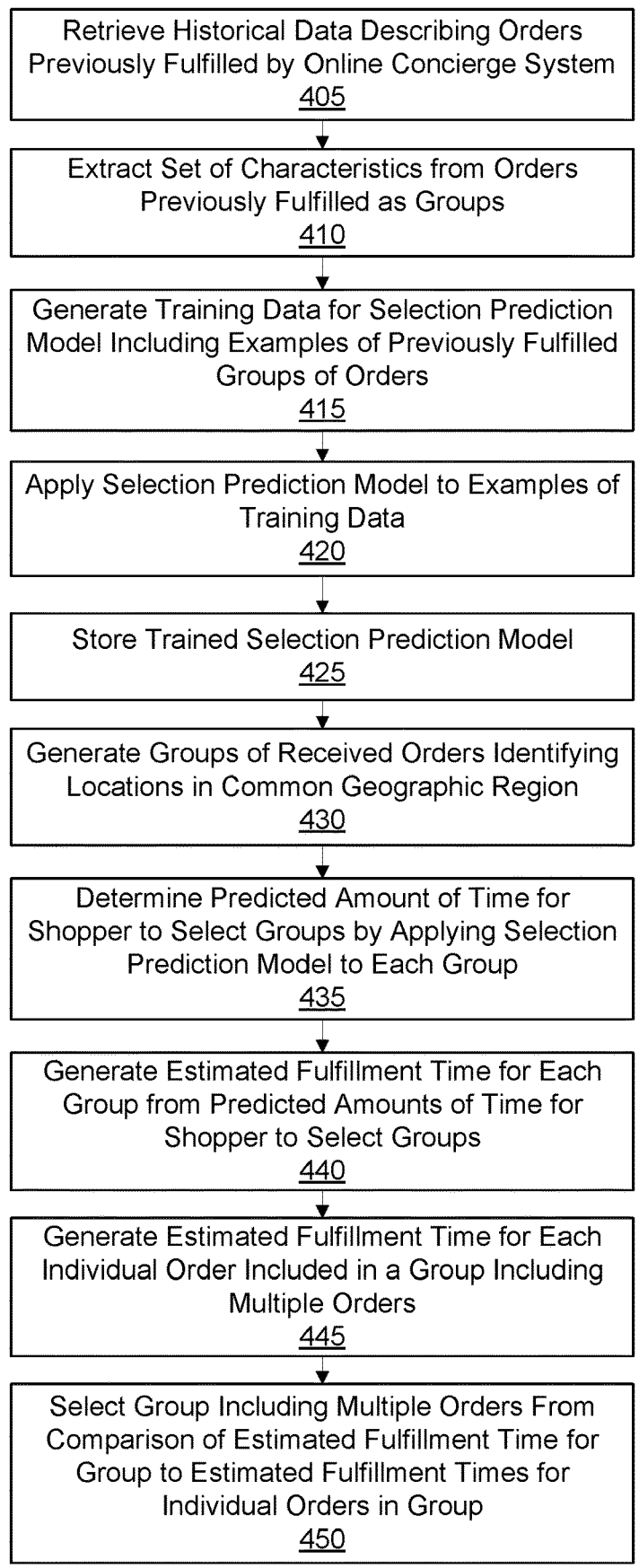
FIG. 4 is a flowchart of a method for an online concierge system determining an estimated amount of time for a shopper to select an order or a group of orders for fulfillment, according to one embodiment.

Determining an Estimated Time for a Shopper to Select an Order or a Group of Orders for Fulfillment FIG. 4 is a flowchart of one embodiment of a method for determining an estimated amount of time for a shopper to select an order or a group of orders for fulfillment. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments.

An online concierge system 102 maintains a plurality of time intervals, such as discrete time intervals, during which orders received by the online concierge system are fulfilled. For example, the online concierge system maintains multiple two hour intervals during for fulfilling orders. This allows a user of the online concierge system 102 to select a discrete time interval for an order provided by the user so items included in the order are delivered to the user at a time within the selected discrete time interval. By selecting a discrete time interval, a user of the online concierge system 102 is able to schedule delivery of items in the order at a future time within the selected discrete time interval, allowing the user to tailor when the order is fulfilled.

Additionally, the online concierge system 102 allows a user to specify a short-term order for fulfillment when there is shopper availability after the online concierge system 102 receives the order. The online concierge system 102 displays an interface to a user allowing the user to identify an order for short-term fulfillment or to select a discrete time interval during which the order is fulfilled. The interface includes an estimated time of arrival for the order in conjunction with an option for short-term fulfillment of the order to provide the user with an estimate of a time by which the user will receive the order to allow the user to more accurately determine whether to identify the order for short-term fulfillment.

To determine the estimated time of arrival for the order, the online concierge system 102 retrieves 405 historical data describing fulfilled orders previously received by the online concierge system 102. For a previously fulfilled order, the historical data includes information identifying a location to which the previously fulfilled order was delivered, items included in the previously fulfilled order, a number of items included in the previously fulfilled order, a value of the previously fulfilled order, a warehouse 110 from which the items of the previously fulfilled order were obtained, a distance traveled by a shopper to deliver items from the warehouse 110 to the location identified by the previously fulfilled order, a time when the online concierge system 102 received the previously fulfilled order, and a time when the previously fulfilled order was fulfilled. From the historical data describing previously fulfilled orders, the online concierge system 102 trains a selection prediction model to determine a predicted amount of time between the online concierge system 102 creating a group including one or more received orders from one or more users and a shopper selecting the group for fulfillment. Hence, the selection prediction model receives a group of orders as input and outputs a predicted amount of time for a shopper to select the group of orders for fulfillment. The selection prediction model may determine the amount of time for the shopper to select a group of orders from characteristics of each order in the group.

In various embodiments, the online concierge system 102 generates and trains a selection prediction model for different geographic regions, with a geographic region including one or more locations identified by orders. Maintaining selection models for different geographic regions allows the online concierge system 102 to account for differences in characteristics of different geographic locations. For example, different selection models for different geographic regions allow a selection model to account for differences in pricing in different geographic regions. As another example, different geographic regions receive different numbers of orders and have different numbers of shoppers available to fulfil orders. By maintaining different selection models for different geographic regions, a particular selection model is better tailored to account for particular characteristics of a corresponding geographic region that affect selection of orders for fulfillment. In various embodiments, the online concierge system 102 trains each selection prediction model at a periodic interval. For example, the online concierge system 102 trains selection prediction models daily, or at any other suitable interval.

To train a selection prediction model, the online concierge system 102 extracts 410 a set of characteristics of previously received orders that have been fulfilled. In various embodiments, the online concierge system 102 identifies a geographic region and identifies a selection prediction model for the identified geographic region. To train the identified selection prediction model, the online concierge system 102 identifies groups of one or more orders including locations within the identified geographic region and extracts characteristics of the identified groups. Each group includes one or more orders, with each order in a group identifying a location within the geographic region. Example characteristics of a group include: one or more warehouses 110 identified by orders included in the group, times when orders included in the group were received by the online concierge system 102, a day of the week when orders included in the group were received by the online concierge system 102, a number of discrete items included in the group, a total quantity of items included in the group, a distance for a shopper to travel to fulfill the orders included in the group, a number of orders in the group, an amount of compensation the shopper receives for fulfilling orders included in the group, and any other suitable information. When determining characteristics of a group including multiple orders, the online concierge system 102 combines characteristics of the orders included in the group to determine the characteristics of the group in various embodiments; for example, the online concierge system 102 sums quantities of items included in each order of a group or sums numbers of discrete items included in each order of a group. Additionally, a characteristic of a group including one or more orders is a value determined from a number of shoppers available in the geographic region at a time when the group was selected by a shopper and a number of groups including orders identifying a location within the geographic region available for selection at the time when the group was selected. For example, the value is a ratio of the number of shoppers available in the geographic region at a time when the group was selected by a shopper and the number of orders identifying a location within the geographic region available for selection. Determining the value from the number of shoppers available in the geographic region and a number of orders identifying a location within the geographic region available for selection allows the online concierge system 102 to account for a relative supply and demand in the geographic region when shoppers selected groups for fulfillment. The online concierge system 102 may extract any suitable characteristics from groups of orders including locations within the identified geographic region in various embodiments.

The online concierge system 102 generates 415 training data for the selection prediction model comprising a plurality of examples that each identify a set of characteristics corresponding to a group of previously received orders. For example, each example includes one or more warehouses 110 identified by orders included in the group, times when orders included in the group were received by the online concierge system 102, a day of the week when orders included in the group were received by the online concierge system 102, a number of discrete items included in the group, a total quantity of items included in the group, a distance for a shopper to travel to fulfill the orders included in the group, a number of orders in the group, an amount of compensation the shopper receives for fulfilling orders included in the group, and the value determined from a number of shoppers available in the geographic region at a time when the group was selected by a shopper and a number of groups including orders identifying a location within the geographic region available for selection at the time when the group was selected. However, in other embodiments, an example of the training data includes a subset of the previously-identified characteristics or includes different or additional characteristics than those previously-identified. Each example of the training data is labeled with a length of time between a time when the group was created and a time when the shopper selected the example for fulfillment. Hence, the online concierge system 102 uses the length of time between creation of previously fulfilled groups of orders and selection of the groups for fulfillment to shoppers for training the selection prediction model, allowing the online concierge system 102 to leverage historical fulfillment of orders by shoppers to determine a length of time between creation of a group of orders by the online concierge system 102 and selection of the group of orders for fulfillment by a shopper.

The online concierge system 102 applies 420 the selection prediction model to each of a plurality of examples of the training data. For an example of the training data (which includes a set of characteristics of a group of orders), application of the selection prediction model to the user generates a predicted amount of time for a shopper to select the group of orders for fulfillment. The online concierge system 102 determines an error term from a difference between the label applied to the example of the training data and the predicted amount of time for a shopper to select the group of orders for fulfillment. The error term may be generated through any suitable loss function, or combination of loss functions, in various embodiments. For example, the loss function is a mean squared error between a predicted amount of time for a shopper to select the group of orders for fulfillment from an example of the training data and a label applied to the corresponding example user of the training data. However, in other embodiments, any loss function or combination of loss functions, may be applied to the predicted amount of time for a shopper to select the group of orders for fulfillment and the label applied to the corresponding example of the training data to generate the error term.

The online concierge system 102 backpropagates the one or more error terms from the label applied to an example of the training data and the predicted amount of time for a shopper to select the group of orders for fulfillment through layers of a network comprising the selection prediction mode after initializing the layers. One or more parameters of the network are modified through any suitable technique from the backpropagation of the one or more error terms through the layers of the network. For example, weights between nodes of the network, such as nodes in different layers of the network, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the network is stopped. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for the layers of the selection prediction network. For example, the online concierge system 102 stores the weights of connections between nodes in the network as the set of parameters of the network in a non-transitory computer readable storage medium. Hence, training of the selection prediction model allows the online concierge system 102 to generate and to store a neural network, or other machine learning model, that generates a predicted amount of time for a shopper to select the group of orders for fulfillment. The selection prediction model may be any machine learning model, such as a neural network, boosted tree, gradient boosted tree or random forest model in various embodiments. In some examples, the selection prediction model is trained via a XGBoost process when the selection prediction model is applied 420 to examples of the training data. The online concierge system 102 retrains the selection prediction model at various intervals, such as at a periodic interval, in various embodiments, allowing the selection prediction model to account for changes in available shoppers within the geographic region or changes in numbers of orders including locations within the geographic region at different times.

Alternatively, the online concierge system 102 generates the trained selection prediction model as a tree based ensemble model combining multiple decision trees. In various embodiments, the online concierge system 102 selects at least a set of examples of the training data (which each include a set of characteristics of a group of orders) and trains a decision tree on each example of the set by applying a decision tree to each example and comparing a predicted amount of time for a shopper to select the group of orders for fulfillment from application of the decision tree to an example to a label applied to the example. For example, the decision tree iteratively selects features of an example of the training data and selects a feature causing a loss function to satisfy one or more criteria, for example a feature minimizing a squared error between a predicted distance from the decision tree and a label applied to the example of the training data. The online concierge system 102 sums the loss function over each example of the set to determine a total loss function and selects a feature having a minimum total loss function across the examples of the training data. Subsequently, the online concierge system 102 splits the examples of the training data into subsets having different values for the selected feature and recursively generates new nodes of the decision tree using the subsets of examples until one or more halting criteria are satisfied (e.g., each leaf node of a decision tree includes a minimum number of examples of the training data).

In some embodiments, the online concierge system 102 trains multiple decision trees in parallel from the examples of the training data, with a different subset of examples of the training data used to train different decision trees, with each decision tree selecting a different set of features of the training data. The subset of the training data used to train a decision tree is grouped based on values for the selected set of features for the decision tree and new nodes of the decision tree are generated using the groups of examples until one or more halting criteria are satisfied (e.g., each leaf node of a decision tree includes a minimum number of examples of the training data). The selection prediction model comprises the set of trained decision trees, with individual decision trees predicting an amount of time for a shopper to select the group of orders for fulfillment from the set of characteristics of the group of orders and the selection prediction model outputting a predicted amount of time for a shopper to select the group of orders for fulfillment predicted by at least a threshold number of the decision trees.

As another example, the online concierge system 102 trains multiple decision trees in series, training an initial decision tree as described above and determining a loss function for the initial decision tree based on differences between a predicted amount of time for a shopper to select the group of orders for fulfillment from the decision tree and a label applied to the example of the training data. For example, the loss function is a squared error function between the predicted amount of time for a shopper to select the group of orders for fulfillment and the label applied to the example of the training data. The online concierge system 102 trains another decision tree based on the results of the loss function for each example of the training data and iteratively trains decision tress, with results of the loss function from a decision tree used to train an immediately subsequent decision tree. For example, a gradient of the loss function from a decision tree is used to train an immediately subsequent decision tree. The online concierge system 102 iteratively trains decision trees from the results of the loss function from another decision tree until a specific number of decision trees are trained or until one or more other halting criteria are satisfied. By iteratively propagating a result of a loss function for a decision tree to a subsequent decision tree, an output of a decision tree compensates for errors from an earlier another tree from which the decision tree receives results of the loss function. The output of the selection prediction model is a combination (e.g., a sum) of the predicted amount of time for a shopper to select the group of orders for fulfillment output by each of the trained decision trees.

After training and storing 425 the trained selection prediction model, when the online concierge system 102 generates 430 a group from one or more received orders and determines 435 a predicted amount of time for a shopper to select the group of orders for fulfillment by applying the selection prediction model to a set of characteristics extracted from the group of orders. In various embodiments, the online concierge system 102 determines a geographic region including locations included in each order of the group, retrieves a selection prediction model corresponding to the determined geographic region, and applies the selection prediction model corresponding to the determined geographic region to the group of orders, allowing the online concierge system 102 to account for conditions particular to the geographic region including locations of the orders in the group when determining a predicted amount of time for a shopper to select the group of orders for fulfillment.

As the online concierge system 102 receives orders including locations identifying the geographic region, the online concierge system 102 generates 430 groups including individual orders and combinations of orders. For each group of orders, the online concierge system 102 determines 435 a predicted amount of time for a shopper to select a group for fulfillment. The online concierge system 102 generates 440 an estimated fulfillment time for each group of orders, with the estimated fulfillment time for a group of orders based on the predicted amount of time for a shopper to select the group for fulfillment. In various embodiments, the estimated fulfillment time for a group combines the predicted amount of time for the shopper to select the group for fulfillment with an estimated travel time for the shopper to obtain the items included in the group from one or more warehouses 110 identified by orders in the group and to deliver the items of the orders of the group to locations specified by orders in the group. For example, the estimated fulfillment time for a group is a sum of the predicted amount of time for a shopper to select the group for fulfillment and the estimated travel time for the shopper to obtain the items included in the group and to deliver the items included in the group to one or more locations identified by orders of the group. In various embodiments, the online concierge system 102 determines the estimated travel time for a group from characteristics of the orders included in the group as well as historical information about traffic or road conditions the online concierge system 102 obtains from a third party system or from previously fulfilled orders by shoppers. Example characteristics of a group used to determine estimated travel time include a number of items in the group (groups with greater number of items may increase a length of time in a warehouse 110 to obtain the items), one or more warehouses 110 from which the items are obtained, distances between warehouses 110 identified by orders of the group, and a distance between the locations of the one or more warehouses 110 from which the items are obtained and locations identified by the one or more orders of the group. The online concierge system 102 may generate and train a travel time prediction model, as further described above in conjunction with the selection prediction model, from characteristics of previously fulfilled groups of orders and travel times for shoppers to fulfill the previously fulfilled groups of orders. The travel time estimation model may be any machine learning model, such as a neural network, boosted tree, gradient boosted tree, random forest model, or combination of machine learning models.

To determine groups of orders displayed to shoppers for selection, the online concierge system 102 determines a cost for fulfilling each group of orders. The cost for fulfilling a group of orders is based on characteristics of orders in a group (e.g., a number of items in then group, a weight of items in the group), the estimated travel time to fulfill the orders of the group, and the predicted amount of time for a shopper to select the group of orders for fulfillment and accounts for costs by the online concierge system 102 for order fulfillment. In various embodiments, the online concierge system 102 applies a cost function to different groups and selects groups for display to the user based on the costs so each order is displayed for individual fulfillment and is displayed in a specific number of groups including multiple orders.

The online concierge system 102 determines candidate groups to which the cost function is applied by accounting for one or more constraints on estimated fulfillment times for groups of orders. The online concierge system 102 identifies a group including a plurality of orders and 102 determines 440 an estimated fulfillment time for individually fulfilling each order of the group. The online concierge system 102 similarly determines 445 an estimated fulfillment time for fulfilling the group including multiple orders and selects 450 the group including multiple orders for application of the cost function in response to the estimated fulfillment time for fulfilling the group being within a threshold amount of time of an estimated fulfillment time for individually fulfilling at least one individual order of the group. If the, the estimated fulfillment time for fulfilling the group is not within a threshold amount of time of an estimated fulfillment time for individually fulfilling at least one individual order of the group. the online concierge system 102 does not select the group of multiple orders for application of the cost function. The threshold amount of time may be a fixed amount specified by the online concierge system 102 or may be a value that is dynamically modified by the online concierge system 102 based on conditions in the geographic region. For example, the online concierge system 102 modifies the threshold amount of time based on a ratio of the number of shoppers available in the geographic region and a number of orders identifying a location within the geographic region available for selection, allowing the online concierge system 102 to adjust the threshold amount based on a supply of shoppers available for order fulfillment relative to a number of orders that identify locations within the geographic region. In other embodiments, the online concierge system 102 determines whether an estimated fulfillment time of a group including multiple orders is within a threshold amount of time from a time specified by an order included in the group. The online concierge system 102 selects 450 the group including multiple orders in response to the estimated fulfillment time of the group being within the threshold amount of time of a time specified by at least one order included in the group, and does not select the group including multiple orders in response to the estimated fulfillment time of the group not being within the threshold amount of time of a time specified by at least one order included in the group. As further described above, the threshold amount of time may be a fixed value or may be dynamically modified by the online concierge system 102.

In various embodiments, the threshold amount of time from the estimated fulfillment time for individually fulfilling at least one individual order of the group is a specific duration determined by the online concierge system 102, which may account for conditions in the geographic region. The online concierge system 102 maintains different threshold amounts of time from the estimated fulfillment time for individually fulfilling at least one individual order of the group. For example, the online concierge system 102 maintains an additional threshold amount of time from the estimated fulfillment time for individually fulfilling at least one individual order of the group, with the additional threshold amount of time longer than the threshold amount of time, and criteria for selecting 450 the group when the estimated fulfillment time for individually fulfilling at least one individual order of the group is greater than the threshold amount of time and less than the additional threshold amount of time. For example, the criteria for selecting 450 the group when the estimated fulfillment time for individually fulfilling at least one individual order of the group is greater than the threshold amount of time and less than the additional threshold amount of time specify a ratio of a difference between a sum of costs to the online concierge system 102 of individually fulfilling orders in the group and a cost to the online concierge system 102 of fulfilling the orders in the group to a difference between the estimated fulfillment time for fulfilling the group and an estimated fulfillment time for individually fulfilling at least one individual order of the group. Hence, the ratio determines a cost savings to the online concierge system 102 for fulfilling the group of orders per unit time relative to the cost of the online concierge system 102 fulfilling individual orders in the group. In response to the ratio equaling or exceeding a threshold value and the estimated fulfillment time for individually fulfilling at least one individual order of the group being greater than the threshold amount of time and less than the additional threshold amount of time, the online concierge system 102 selects 450 the group, as further described above. Alternatively, the online concierge system 102 maintains a single threshold value and criteria for selecting 450 the group. For example, the online concierge system 102 maintains the single threshold value and selects 450 the group in response to the group satisfying at least a threshold amount of the criteria and the estimated fulfillment time for fulfilling the group being within the single threshold amount of time of the estimated fulfillment time for individually fulfilling at least one individual order of the group. For example, the online concierge system 102 determines a ratio of a difference between a sum of costs to the online concierge system 102 of individually fulfilling orders in the group and a cost to the online concierge system 102 of fulfilling the orders in the group to a difference between the estimated fulfillment time for fulfilling the group and an estimated fulfillment time for individually fulfilling at least one individual order of the group, as further described above, and selects 450 the group in response to the ratio equaling or exceeding the threshold value and in response to the estimated fulfillment time for fulfilling the group being within the single threshold amount of time of an estimated fulfillment time for individually fulfilling at least one individual order of the group. Hence, the online concierge system 102 may account for a cost to the online concierge system 102 for fulfilling a group of orders relative to the cost to the online concierge system 102 for individually fulfilling different orders in the group when determining whether to select 450 a group to evaluate for display.

Accounting for the predicted amount of time for a shopper to select the group of orders for fulfillment when determining the estimated fulfillment times allows the online concierge system 102 to more accurately estimate an amount of time from creation of a group of orders to fulfillment of the group of orders. As groups including larger numbers of orders may have shorter times between creation and selection by a shopper, such a reduction in time to selection by a shopper for fulfillment may offset increased travel time for the shopper. Similarly, a group including a single order may have a shorter estimated travel time for fulfillment but a longer time from creation to selection for fulfillment, with the increased time from creation to selection resulting in a longer total time for fulfillment for the group including the single order. Further, accounting for a threshold amount of time from a fulfillment time for fulfillment of a single order or from a time specified by an order in a group allows the online concierge system 102 to apply the cost function to a larger number of groups, allowing the online concierge system 102 to evaluate an increased number of groups, allowing the online concierge system 102 to determine more optimal groups of orders to display to shoppers for selection that minimize costs to the concierge system 102 of fulfillment.

Figure 5:
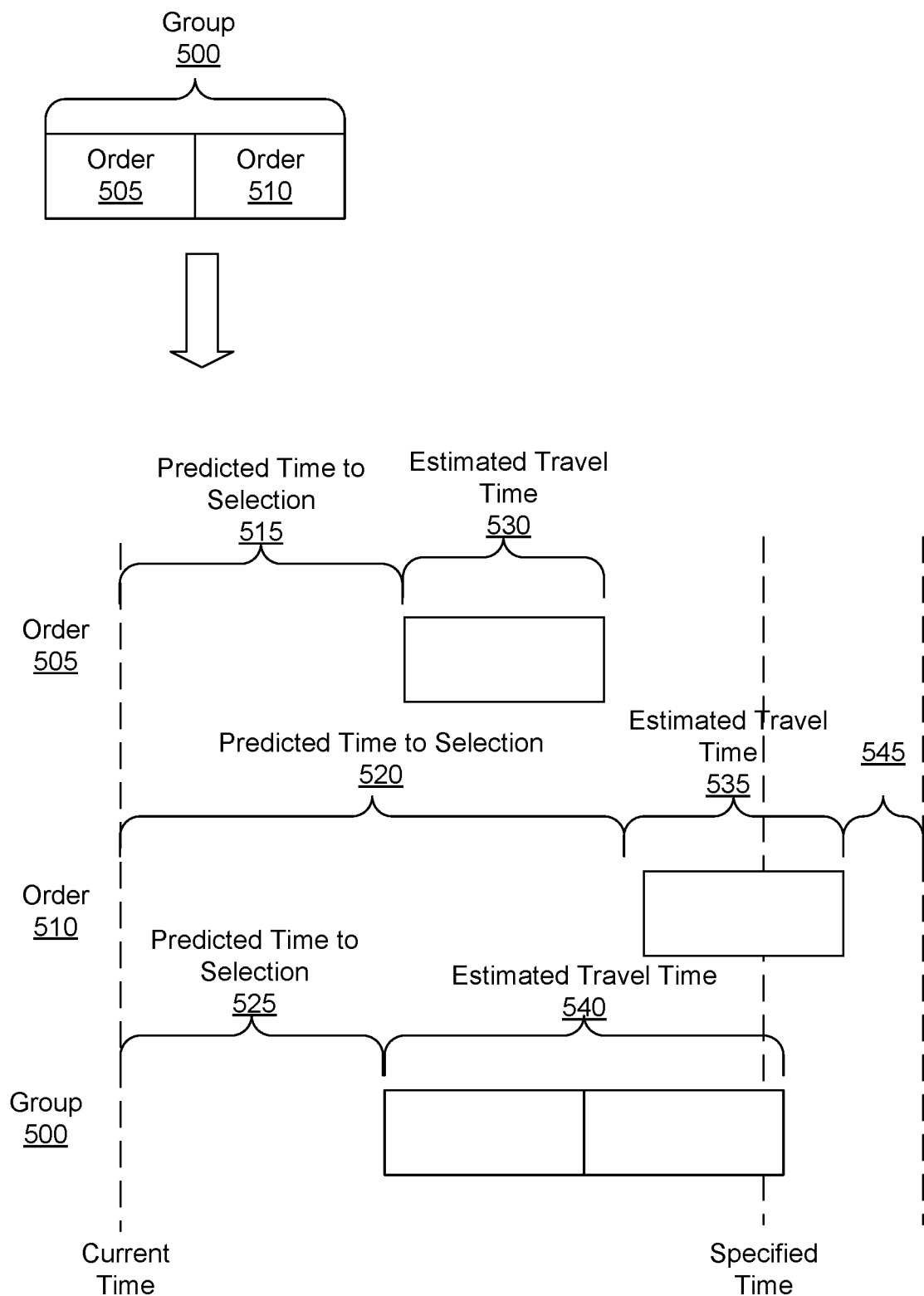
FIG. 5 is an example selection of an online concierge system accounting for predicted times of shoppers selecting groups for fulfillment when selecting candidate groups to evaluate for display to shoppers, according to one embodiment.

FIG. 5 is an example selection of an online concierge system 102 accounting for predicted times of shoppers selecting groups for fulfillment when selecting candidate groups to evaluate for display to shoppers. For purposes of illustration, FIG. 5 shows a group 500 including two orders, order 505 and order 510. As further described above in conjunction with FIG. 4, the online concierge system 102 selects groups including one or more orders to which a cost function is applied to determine whether to display a group to a shopper for selection. TO determine whether to apply the cost function to group 500 in the example of FIG. 5, the online concierge system 102 identifies order 505 and order 510. As further described above in conjunction with FIG. 4, the online concierge system 102 determines a predicted time 515 for a shopper to select order 505 from characteristics of order 505, a predicted time 520 for a shopper to select order 510 from characteristics of order 510, and a predicted time 525 for a shopper to select group 500 from characteristics of the order 505 and of the order 510. As further described above in conjunction with FIG. 4, the online concierge system 102 applies a trained selection prediction model to characteristics of order 505, to characteristics of order 510, and to characteristics of group 500 to determine predicted time 520, predicted time 525, and predicted time 530, respectively.

Similarly, the online concierge system 102 determines an estimated travel time 530 for fulfilling order 505, an estimated travel time 535 for fulfilling order 510, and an estimated travel time 540 for fulfilling group 500, as further described above in conjunction with FIG. 4. Combining the predicted time for selection by a shopper with the estimated travel time allows the online concierge system to determine an estimated fulfillment time. For example, the estimated fulfillment time for order 505 is a sum of predicted time 515 and estimated travel time 530. Similarly, the estimated fulfillment time for order 510 is a sum of predicted time 520 and estimated travel time 535, while the estimated fulfillment time for group 500 is a sum of predicted time 525 and estimated travel time 540. Hence, the online concierge system 102 accounts for both a predicted time until a shopper selects an order 505, 510 or selects the group 500 for fulfillment and the estimated travel time for the shopper to fulfill the order 505, 510 or the group 500. As a number of orders included in a group for fulfillment affects the length of time for a shopper to select a group, accounting for the predicted time until selection by a shopper allows the online concierge system 102 to more accurately estimate the time for a group to be fulfilled.

In the example of FIG. 5, the online concierge system 102 maintains a threshold amount of time 545 from an estimated time for fulfillment of a group for determining whether to apply a cost function to group 500. However, in other embodiments, the online concierge system 102 maintains a threshold amount of time from a time specified by one or more orders 505, 510 included in a group. As further described above in conjunction with FIG. 4, the threshold amount of time 545 may be a fixed value or may be dynamically determined or modified by the online concierge system 102. In the example shown by FIG. 5, the online concierge system 102 selects group 500 for application of a cost function in response to the estimated time for fulfillment of the group 500 being within the threshold amount of time 545 from an estimated time for fulfillment of order 505 or from an estimated time for fulfillment of order 510. In the example of FIG. 5, the estimated time for fulfillment of the group 500 less than the threshold amount of time 545 from the estimated time for fulfillment of order 510, so the online concierge system 102 selects group 500 for application of the cost function.

In contrast, conventional online concierge systems 102 disregards groups including multiple orders from application of the cost function if the estimated time for fulfillment of the order exceeds a time specified by one or more orders in the group. Hence, a conventional online concierge system 102 would not evaluate a cost of group 500 because the estimated time for fulfillment of group 500 exceeds the specified time in order 505 and in order 510. However, in the example of FIG. 5, despite the estimated time for fulfillment of group 500 being longer than the specified time, the predicted time 525 to selection of group 500 is shorter than the predicted time 520 to selection for order 510 individually, resulting in an overall shorter estimated time for fulfillment of group 500 relative to the estimated time for fulfillment of order 510. Conventional online concierge systems 102 would not evaluate a cost for fulfilling group 500, preventing shoppers from selecting group 500, which increases an overall consumption of resources by limiting shoppers to selecting individual fulfillment of order 505 or order 510.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
  at an online system comprising memory and one or more processors:
  receiving orders from a plurality of user devices, each order including one or more items and associated with a different physical delivery location;
  generating candidate groups of the received orders, each candidate group including one or more of the received orders that have corresponding physical delivery locations that are within a common geographic region;
  extracting a set of characteristics for each candidate group from the one or more orders included in the candidate group, an extracted set of characteristics including a value determined from a number of shoppers available in the common geographic region and a number of orders being within the common geographic region;
  training a plurality of selection prediction models, each selection prediction model specific to a geographical region and being a machine learning model configured to generate a predicted time for a shopper to select a candidate group for fulfillment, wherein training a selection prediction model comprises:
    retrieving a set of training data comprising previous groups of previous orders, each previous group associated with previously-identified characteristics and a label of a length of time between a time when the previous group was created and a time when a shopper selected the previous group for fulfillment,
    generating, using the selection prediction model, predicted times for shoppers to select the previous groups,
    comparing the predicted times to the labels associated with the previous groups to generate one or more error terms, and
    backpropagating the one or more error terms to modify one or more parameters of the selection prediction model;
  retraining the plurality of selection prediction models at a plurality of time intervals to account for changes in fulfillment parameters in the specific geographical region, wherein retraining the selection prediction model in one of the time intervals comprises:
  receiving additional training examples captured in the one of the time intervals;
  splitting the additional training examples into subsets having different values of the fulfillment parameters; and
  recursively generating new nodes of the selection prediction model using the subsets to group one or more orders in the subsets together;
  accessing a particular selection prediction model from the plurality of selection prediction models, the particular selection model corresponding to the common geographic region, the particular selection prediction model configured to receive the extracted set of characteristics of a given candidate group and output a predicted time for a shopper to select the given candidate group for fulfillment;
  determining the predicted time for the shopper to select each candidate group for fulfillment by applying the machine learning model to the extracted set of characteristics corresponding to each candidate group;

determining an estimated time for fulfillment for each candidate group, the estimated time for fulfillment for the group determined from the predicted time for the shopper to select the candidate group;

identifying a candidate group including a plurality of orders;

selecting the identified candidate group as a selected group for evaluation in response to an estimated time for fulfillment of the selected group being within a threshold amount of time from an estimated time for fulfillment of at least one of the plurality of orders included in the selected group;

causing a shopper mobile device to display the selected group of the plurality of orders for the shopper to select for the fulfillment of the selected group as a whole; and receiving a fulfillment confirmation of the selected group of multiple orders from the shopper mobile device, wherein a total delivery time for the fulfillment of the selected group as a whole is shorter than a total delivery time to fulfill the plurality of orders individually that are associated with different physical delivery locations.

2. The method of claim 1, wherein the value determined from the number of shoppers available in the common geographic region and the number of orders identifying the physical delivery location within the common geographic region available for selection comprises:

a ratio of the number of shoppers available in the common geographic region to the number of orders identifying the physical delivery location within the common geographic region available for selection.

3. The method of claim 1, wherein the set of characteristics for each candidate group includes one or more selected from: one or more warehouses identified in one or more orders in the candidate group, times when orders included in the candidate group were received by the online system, and days of the week when orders included in the candidate group were received by the online system.

4. The method of claim 1, wherein the set of characteristics for each candidate group includes one or more selected from: a number of discrete items included in the candidate group, a total quantity of items included in the candidate group, a distance for the shopper to travel to fulfill the orders included in the candidate group, a number of orders in the candidate group, and an amount of compensation the shopper receives for fulfilling orders included in the candidate group.

5. The method of claim 1, wherein training of a selection prediction model further comprises:

initializing a network that comprises a plurality of layers of a neural network;

for one or more training data:
applying the network to the previously-identified characteristics;
backpropagating one or more error terms obtained from one or more loss functions to update a set of parameters of the network, the backpropagating performed through the neural network and one or more of the error terms based on a difference between the label and the predicted time for the shopper to select the group previously generated by the online system for fulfilment;
stopping the backpropagation after the one or more loss functions satisfy one or more criteria; and
storing the set of parameters of the layers of the network.

6. The method of claim 1, wherein training of a selection prediction model further comprises:

training a plurality of decision trees where a result of a loss function of a decision tree is an input to a subsequent decision tree by, for one or more training data:
applying a decision tree to the previously-identified characteristics;
iteratively propagating a result of one or more loss functions from the decision tree to the subsequent decision tree for the plurality of decision trees, one or more of the error terms based on a difference between the label and the predicted time for the shopper to select the group previously generated by the online system for fulfilment; and
stopping the propagation after one or more halting criteria are satisfied.

7. The method of claim 1, wherein determining the estimated time for fulfillment for each candidate group comprises:

determining an estimated travel time for obtaining items included in the candidate group and delivering the obtained items to one or more physical delivery locations included in the candidate group; and determining the estimated time for fulfillment for the candidate group as a combination of the predicted time for the shopper to select the candidate group for fulfillment and the estimated travel time.

8. The method of claim 1, wherein the threshold amount of time comprises a fixed value maintained by the online system.

9. The method of claim 1, wherein the threshold amount of time comprises a value dynamically modified by the online system.

10. The method of claim 1, further comprising:

determining a cost to the online system for fulfilling the selected group; and displaying the selected group to one or more shoppers in response to the determined cost satisfying one or more criteria.

11. A computer program product comprising a non-transitory computer readable storage medium having instructions encoded thereon that, when executed by a processor, cause the processor to:

receive, by an online system, orders from a plurality of user devices, each order including one or more items and associated with a different physical delivery location;

generate candidate groups of the received orders, each candidate group including one or more of the received orders that have corresponding physical delivery locations that are within a common geographic region;

extract a set of characteristics for each candidate group from the one or more orders included in the candidate group, an extracted set of characteristics including a value determined from a number of shoppers available in the common geographic region and a number of orders being within the common geographic region;

train a plurality of selection prediction models, each selection prediction model specific to a geographical region and being a machine learning model configured to generate a predicted time for a shopper to select a candidate group for fulfillment, wherein training a selection prediction model comprises:

retrieving a set of training data comprising previous groups of previous orders, each previous group associated with previously-identified characteristics and a label of a length of time between a time when the previous group was created and a time when a shopper selected the previous group for fulfillment, generating, using the selection prediction model, predicted times for shoppers to select the previous groups, comparing the predicted times to the labels associated with the previous groups to generate one or more error terms, and backpropagating the one or more error terms to modify one or more parameters of the selection prediction model;

retrain the plurality of selection prediction models at a plurality of time intervals to account for changes in fulfillment parameters in the specific geographical region, wherein retraining the selection prediction model in one of the time intervals comprises:

receiving additional training examples captured in the one of the time intervals;

splitting the additional training examples into subsets having different values of the fulfillment parameters; and recursively generating new nodes of the selection prediction model using the subsets to group one or more orders in the subsets together;

access a particular selection prediction model from the plurality of selection prediction models, the particular selection model corresponding to the common geographic region, the particular selection prediction model configured to receive the extracted set of characteristics of a given candidate group and output a predicted time for a shopper to select the given candidate group for fulfillment;

determine the predicted time for the shopper to select each candidate group for fulfillment by applying the machine learning model to the extracted set of characteristics corresponding to each candidate group;

determine an estimated time for fulfillment for each candidate group, the estimated time for fulfillment for the group determined from the predicted time for the shopper to select the candidate group;

identify a candidate group including a plurality of orders;

select the identified candidate group as a selected group for evaluation in response to an estimated time for fulfillment of the selected group being within a threshold amount of time from an estimated time for fulfillment of at least one of the plurality of orders included in the selected group;

cause a shopper mobile device to display the selected group of the plurality of orders for the shopper to select for the fulfillment of the selected group as a whole; and receive a fulfillment confirmation of the selected group of multiple orders from the shopper mobile device, wherein a total delivery time for the fulfillment of the selected group as a whole is shorter than a total delivery time to fulfill the plurality of orders individually that are associated with different physical delivery locations.

12. The computer program product of claim 11, wherein the value determined from the number of shoppers available in the common geographic region and the number of orders identifying the physical delivery location within the common geographic region available for selection comprises:

a ratio of the number of shoppers available in the common geographic region to the number of orders identifying the physical delivery location within the common geographic region available for selection.

13. The computer program product of claim 11, wherein the set of characteristics for each candidate group includes one or more selected from: one or more warehouses identified in one or more orders in the candidate group, times when orders included in the candidate group were received by the online system, and days of the week when orders included in the candidate group were received by the online system.

14. The computer program product of claim 11, wherein the set of characteristics for each candidate group includes one or more selected from: a number of discrete items included in the candidate group, a total quantity of items included in the candidate group, a distance for the shopper to travel to fulfill the orders included in the candidate group, a number of orders in the candidate group, and an amount of compensation the shopper receives for fulfilling orders included in the candidate group.

15. The computer program product of claim 11, wherein training of a selection prediction model further comprises:

initializing a network that comprises a plurality of layers of a neural network;

for one or more training data:

applying the network to the previously-identified characteristics;

backpropagating one or more error terms obtained from one or more loss functions to update a set of parameters of the network, the backpropagating performed through the neural network and one or more of the error terms based on a difference between the label and the predicted time for the shopper to select the group previously generated by the online system for fulfilment;

stopping the backpropagation after the one or more loss functions satisfy one or more criteria; and storing the set of parameters of the layers of the network.

16. The computer program product of claim 11, wherein training of a selection prediction model further comprises:

training a plurality of decision trees where a result of a loss function of a decision tree is an input to a subsequent decision tree by, for one or more training data:

applying a decision tree to the previously-identified characteristics;

iteratively propagating a result of one or more loss functions from the decision tree to the subsequent decision tree for the plurality of decision trees, or more of the error terms based on a difference between the label and the predicted time for the shopper to select the group previously generated by the online system for fulfilment; and stopping the propagation after one or more halting criteria are satisfied.

17. The computer program product of claim 11, wherein determine the estimated time for fulfillment for each candidate group comprises:

determine an estimated travel time for obtaining items included in the candidate group and delivering the obtained items to one or more physical delivery locations included in the candidate group; and determine the estimated time for fulfillment for the candidate group as a combination of the predicted time for the shopper to select the candidate group for fulfillment and the estimated travel time.

18. The computer program product of claim 11, wherein the threshold amount of time comprises a fixed value maintained by the online system.

19. The computer program product of claim 11, wherein the threshold amount of time comprises a value dynamically modified by the online system.

20. A system comprising:
one or more processors; and
memory configured to store code comprising instructions, wherein the instructions, when executed by the one or more processors, cause the one or more processors to:
receive, by an online system, orders from a plurality of user devices, each order including one or more items and associated with a different physical delivery location;
generate candidate groups of the received orders, each candidate group including one or more of the received orders that have corresponding physical delivery locations that are within a common geographic region;
extract a set of characteristics for each candidate group from the one or more orders included in the candidate group, an extracted set of characteristics including a value determined from a number of shoppers available in the common geographic region and a number of orders being within the common geographic region;
train a plurality of selection prediction models, each selection prediction model specific to a geographical region and being a machine learning model configured to generate a predicted time for a shopper to select a candidate group for fulfillment, wherein training a selection prediction model comprises:
retrieving a set of training data comprising previous groups of previous orders, each previous group associated with previously-identified characteristics and a label of a length of time between a time when the previous group was created and a time when a shopper selected the previous group for fulfillment,
generating, using the selection prediction model, predicted times for shoppers to select the previous groups,
comparing the predicted times to the labels associated with the previous groups to generate one or more error terms, and
backpropagating the one or more error terms to modify one or more parameters of the selection prediction model;
retrain the plurality of selection prediction models at a plurality of time intervals to account for changes in fulfillment parameters in the specific geographical region, wherein retraining the selection prediction model in one of the time intervals comprises:
receiving additional training examples captured in the one of the time intervals;
splitting the additional training examples into subsets having different values of the fulfillment parameters; and
recursively generating new nodes of the selection prediction model using the subsets to group one or more orders in the subsets together;
access a particular selection prediction model from the plurality of selection prediction models, the particular selection model corresponding to the common geographic region, the particular selection prediction model configured to receive the extracted set of characteristics of a given candidate group and output a predicted time for a shopper to select the given candidate group for fulfillment;
determine the predicted time for the shopper to select each candidate group for fulfillment by applying the machine learning model to the extracted set of characteristics corresponding to each candidate group;
determine an estimated time for fulfillment for each candidate group, the estimated time for fulfillment for the group determined from the predicted time for the shopper to select the candidate group;
identify a candidate group including a plurality of orders;
select the identified candidate group as a selected group for evaluation in response to an estimated time for fulfillment of the selected group being within a threshold amount of time from an estimated time for fulfillment of at least one of the plurality of orders included in the selected group;
cause a shopper mobile device to display the selected group of the plurality of orders for the shopper to select for the fulfillment of the selected group as a whole; and
receive a fulfillment confirmation of the selected group of multiple orders from the shopper mobile device, wherein a total delivery time for the fulfillment of the selected group as a whole is shorter than a total delivery time to fulfill the plurality of orders individually that are associated with different physical delivery locations.

* * * * *